US010489763B2

(12) United States Patent
Kamat

(10) Patent No.: US 10,489,763 B2
(45) Date of Patent: Nov. 26, 2019

(54) COMMUNICATING PAYMENTS

(71) Applicant: Shreyas Kamat, Draper, UT (US)

(72) Inventor: Shreyas Kamat, Draper, UT (US)

(*) Notice: Subject to any disclaimer, the term of this patent is extended or adjusted under 35 U.S.C. 154(b) by 436 days.

(21) Appl. No.: 15/459,298

(22) Filed: Mar. 15, 2017

(65) Prior Publication Data
US 2017/0193479 A1   Jul. 6, 2017

Related U.S. Application Data

(63) Continuation-in-part of application No. 14/024,425, filed on Sep. 11, 2013, now abandoned.

(51) Int. Cl.
| G06Q 40/00 | (2012.01) |
| G06Q 20/18 | (2012.01) |
| G06Q 20/32 | (2012.01) |
| G06Q 20/02 | (2012.01) |
| G06Q 20/20 | (2012.01) |

(52) U.S. Cl.
CPC ........... *G06Q 20/18* (2013.01); *G06Q 20/023* (2013.01); *G06Q 20/20* (2013.01); *G06Q 20/202* (2013.01); *G06Q 20/327* (2013.01); *G06Q 20/3224* (2013.01); *G06Q 20/3274* (2013.01); *G06Q 20/3276* (2013.01); *G06Q 20/3278* (2013.01); *G06Q 2220/00* (2013.01)

(58) Field of Classification Search
CPC ..................................................... G06Q 40/00
USPC ......................................................... 705/36 R
See application file for complete search history.

(56) References Cited

U.S. PATENT DOCUMENTS

| 6,260,027 | B1 | 7/2001 | Takahashi et al. |
| 7,099,850 | B1 | 8/2006 | Mann, II et al. |
| 7,689,508 | B2 | 3/2010 | Davis et al. |
| 8,452,654 | B1 | 5/2013 | Wooters et al. |
| 8,583,549 | B1 | 11/2013 | Mohsenzadeh |
| 8,606,640 | B2 | 12/2013 | Brody et al. |
| 2004/0122685 | A1 | 6/2004 | Bunce |
| 2005/0250538 | A1 | 11/2005 | Narasimhan et al. |
| 2006/0208065 | A1 | 9/2006 | Mendelovich et al. |
| 2007/0255564 | A1 | 11/2007 | Yee et al. |
| 2008/0010190 | A1 | 1/2008 | Rackley, III et al. |
| 2008/0116264 | A1 | 5/2008 | Hammad et al. |
| 2009/0240626 | A1 | 9/2009 | Hasson et al. |
| 2010/0191570 | A1 | 7/2010 | Michaud et al. |
| 2010/0205091 | A1 | 8/2010 | Graziano et al. |
| 2011/0201306 | A1 | 8/2011 | Al-Harbi |
| 2011/0276418 | A1 | 11/2011 | Velani |
| 2011/0288922 | A1 | 11/2011 | Thomas et al. |
| 2012/0271712 | A1 | 10/2012 | Katzin et al. |
| 2013/0030934 | A1 | 1/2013 | Bakshi et al. |
| 2014/0012701 | A1 | 1/2014 | Wall et al. |
| 2014/0164082 | A1 | 6/2014 | Sun et al. |
| 2014/0244365 | A1 | 8/2014 | Price et al. |
| 2015/0006271 | A1 | 1/2015 | Oppenheim et al. |
| 2015/0186871 | A1 | 7/2015 | Laracey |
| 2015/0220924 | A1 | 8/2015 | Bakker |

*Primary Examiner* — Kirsten S Apple
(74) *Attorney, Agent, or Firm* — Kunzler Bean & Adamson

(57) ABSTRACT

For communicating payments, a mobile device reads a point-of-sale code from a point-of-sale device. A clearing house generates a payment authorization comprising an authorization code and a transaction amount. The clearing house communicates the payment authorization through the mobile device to the point-of-sale device. The point-of-sale device completes the transaction in response to receiving the payment authorization.

20 Claims, 20 Drawing Sheets

205

| Merchant Code 840 |
| Address 845 |
| Unit Code 850 |
| Register Code 855 |
| Time Stamp 860 |

820

| Point-of-Sale Code 205 |
| Account Alias 815 |

210

| Point-of-Sale Code 205 |
| --- |
| Items 240 |
| Prices 250 |
| Item Descriptions 241 |
| Special Offers 42 |
| Nutrition Information 44 |
| Account Alias 815 |

213

| Point-of-Sale Code 205 |
| --- |
| Items 240 |
| Prices 250 |
| Special Offers 42 |
| Account Alias 815 |
| Transaction ID 891 |

215

| Point-of-Sale Code |
| 205 |
| Authorization Code |
| 890 |
| Transaction Amount |
| 870 |
| Items |
| 240 |
| Prices |
| 250 |
| Time Stamp |
| 860 |

800

| Account ID |
| 805 |
| Payment Information |
| 810 |
| Account Alias |
| 815 |
| Transaction Records |
| 830 |

875

| Point-of-Sale Locations 295 |
| Purchase Menus 210 |
| Price Comparisons 265 |

270

| Item Inventory 275 |
| Item Inventory 275 |
| Inventory Report 276 |
| Inventory Alert 277 |

COMMUNICATING PAYMENTS

CROSS-REFERENCE TO RELATED APPLICATIONS

This is a continuation-in-part application and claims priority to U.S. patent application Ser. No. 14/024,425 entitled "COMMUNICATING PAYMENTS" and filed on Sep. 11, 2013 for Shreyas Kamat, which is incorporated herein by reference, and which claims priority to Provisional Patent Application No. 61/700,214 entitled "COMMUNICATING PAYMENTS" and filed on Sep. 12, 2012 for Shreyas Kamat, which is incorporated herein by reference.

BACKGROUND

Field

The subject matter disclosed herein relates to payments and more particularly relates to communicating payments.

Description of the Related Art

Electronic payments are increasingly popular. Unfortunately, many point-of-sale devices have no access to a network through which to complete a transaction.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
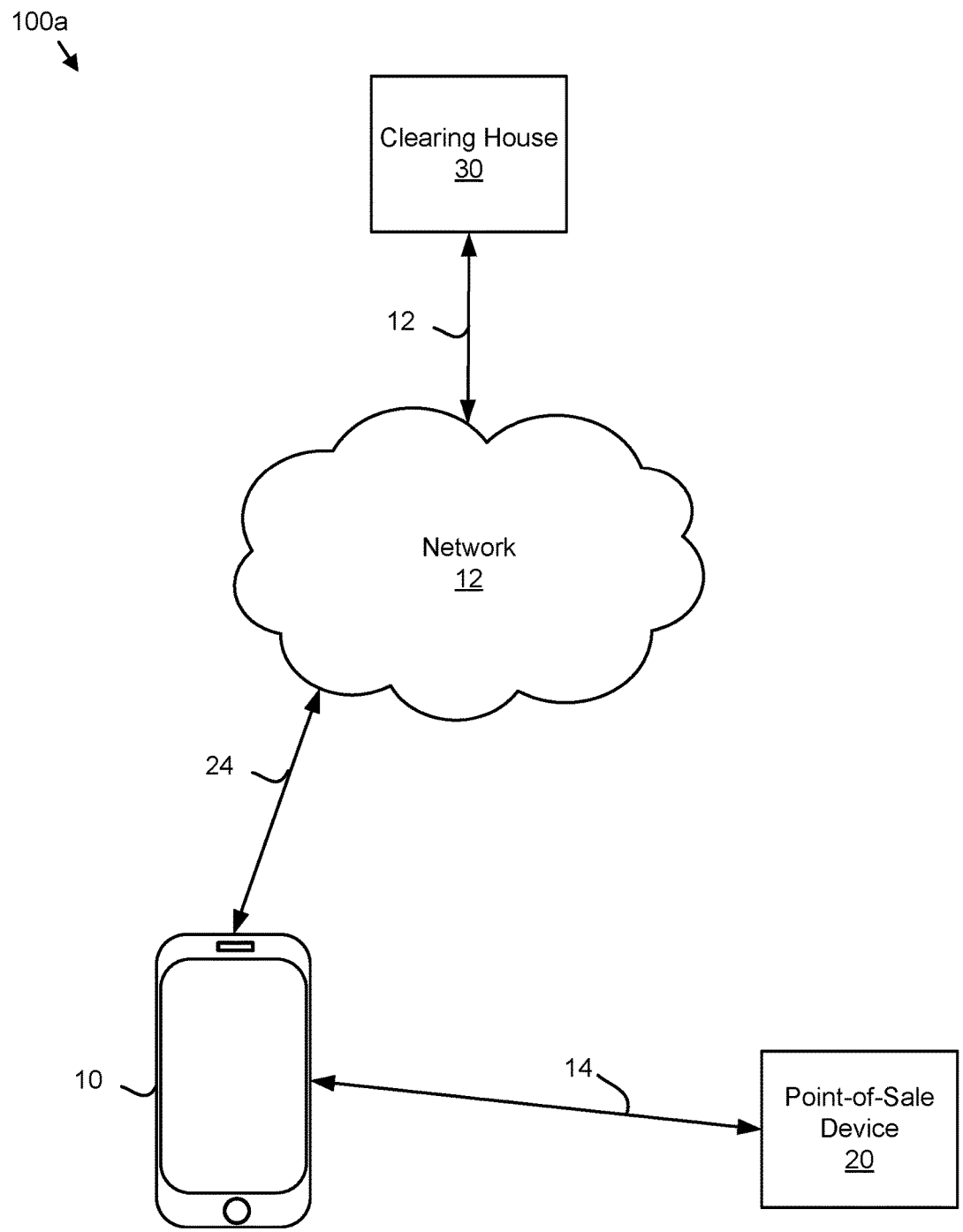
FIGS. 1A-D are schematic block diagrams illustrating embodiments of payment systems.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible, non-transitory computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

FIGS. 1A-D are schematic block diagrams illustrating embodiments of payment systems 100. The system 100*a* depicted in FIG. 1A includes a mobile device 10, a point-of-sale device 20, and a clearing house 30.

In the depicted embodiment, the point-of-sale device 20 is not in communication with the network 12. Thus the point-of-sale device 20 may be unable to communicate payment information, receive payment confirmations, verify the validity of a payment account, and the like. In the past, such point-of-sale devices 20 would be unable to receive electronic payments. However, the increasing popularity of electronic payments would put such a point-of-sale device 20 at a distinct competitive advantage.

The embodiments described herein securely communicate payments between the mobile device 10 and the point-of-sale device 20 and/or another mobile device 10. In addition, the payments may be verifiable. The point-of-sale device 20 is thus able to receive electronic payments even if the point-of-sale device 20 is not connected to the network 12. The point-of-sale device 20 may be a vending machine, a food vendor kiosk, a transit kiosk, a service kiosk, a parking kiosk, a ticket kiosk, a rental kiosk, a fuel kiosk, and the like.

The mobile device 10 may be a mobile telephone, a tablet computer, an eye glass computer, a wearable computer, a payment fob, or the like. The mobile device 10 may communicate over a network connection 24 through the network 12 with the clearing house 30. The network 12 may be a cellular telephone network, a wide-area network, a local area network, a wireless network, the Internet, a BLUETOOTH® network, or combinations thereof.

The mobile device 10 may communicate with the point-of-sale device 20 through short range communications 14. In one embodiment, the short range communications 14 maybe optical communications. For example, one of the mobile device 10 or the point-of-sale device 20 may display a point-of-sale code encoded as a graphic while the other scans the graphic. Alternatively, the short range communications 14 may be infrared communications. In one embodiment, the short range communications 14 conform to a near field communication (NFC) protocol including but are not limited to ISO/IEC 1809.

The clearing house 30 may be embodied in one or more servers. In one embodiment, the clearing house 30 maintains a user account associated with the mobile device 10. The user account may account information for obtaining funds and/or an account balance. However, the account information is never communicated outside of the clearing house 30.

In one embodiment, the mobile device 10 receives the point-of-sale code from the point-of-sale device 20 over the short range communications 14. The mobile device 10 may further communicate the point-of-sale code to the clearing house 30. The point-of-sale code may be encrypted. The clearing house 30 may generate a payment authorization. The payment authorization may be encrypted. The payment authorization may be communicated through the mobile device 10 and the short range communications 14 to the point-of-sale device 20. Upon receipt of the payment authorization, the point-of-sale device 20 may complete the transaction. For example, the point-of-sale device 20 may deliver an item such as food, fuel, service, and the like.

Figure 1B:
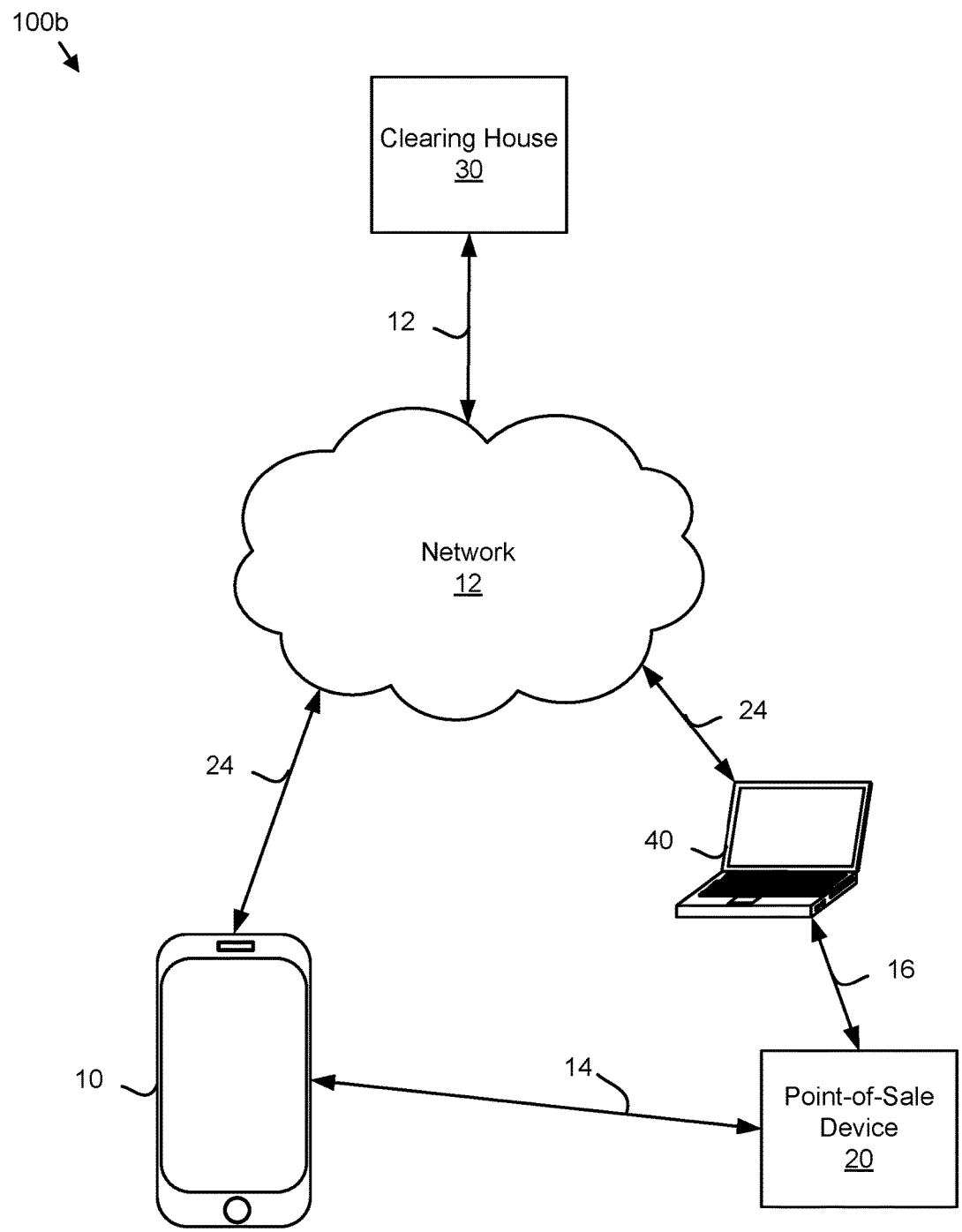

The system 100b depicted in FIG. 1B further includes a transmission device 40. In one embodiment, the transmission device 40 downloads payment authorizations from the point-of-sale device 20. The transmission device 40 may be a mobile computer, a tablet computer, a mobile telephone, a custom device, and the like. The transmission device 40 may receive the payment authorizations over a communication link 16. The communication link 16 may be a universal serial bus (USB) connection, NFC protocol communications, a BLUETOOTH® connection, or the like. The transmission device 40 may communicate the payment authorizations through a network connection 24 over the network 12 to the clearing house 30. In one embodiment, the transmission device 40 must provide a secure key in order to receive the payment authorizations. In a certain embodiment, the payment authorizations are encrypted.

Figure 1C:
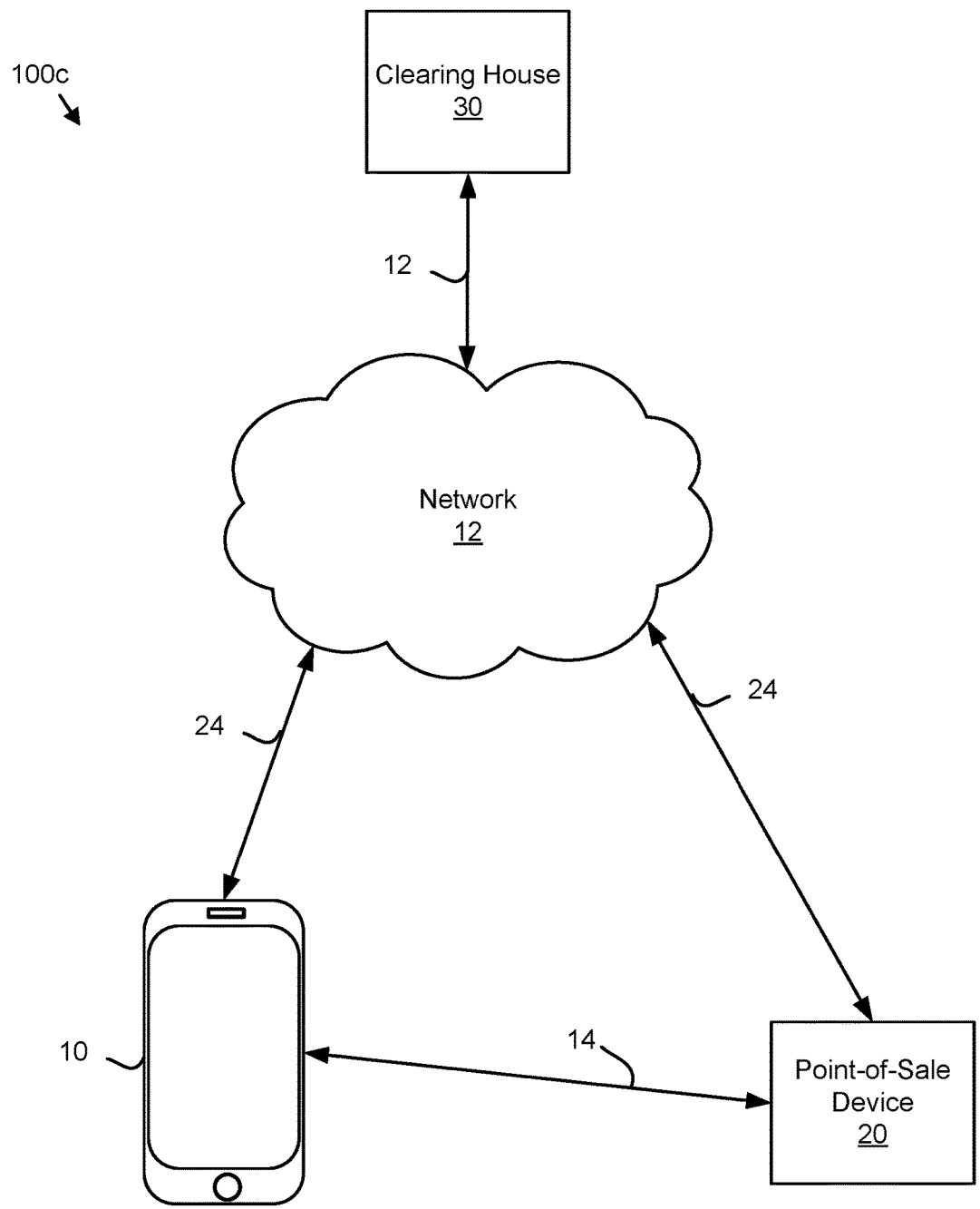

In the system 100c depicted in FIG. 1C, the point-of-sale device 20 may have a network connection 24 with the network 12. The point-of-sale device 20 may communicate the payment authorizations over the network 12 to the clearing house 30. In one embodiment, the point-of-sale device 20 encrypts the payment authorizations with a secure key for transmission to the clearing house 30.

Figure 1D:
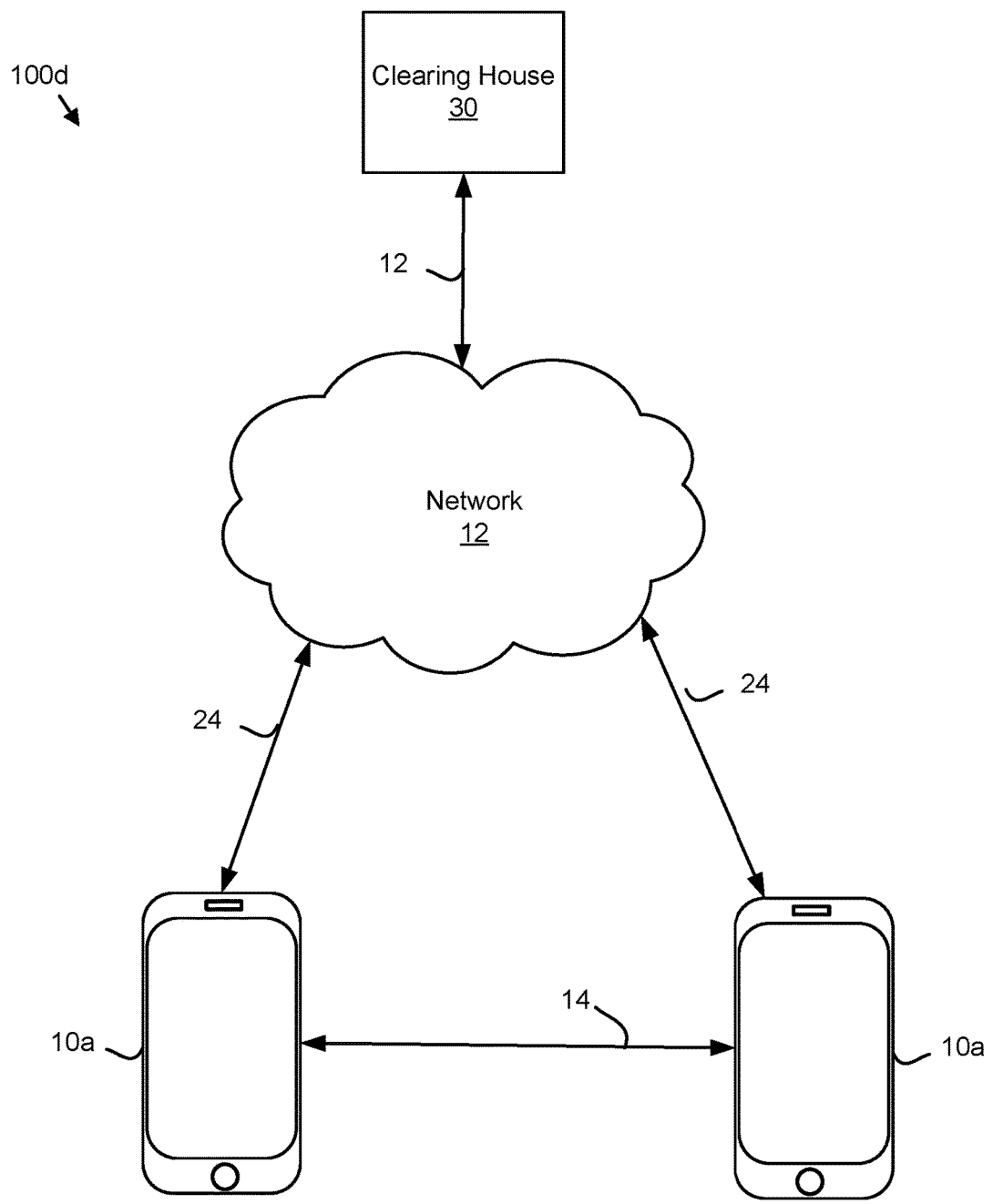

In the system 100d depicted in FIG. 1D, a first mobile device 10a may make a payment to a second mobile device 10b. In one embodiment, the first mobile device 10a receives the point-of-sale code from the second mobile device 10b over the short range communications 14. The first mobile device 10a may further communicate the point-of-sale code to the clearing house 30. The point-of-sale code may be encrypted. The clearing house 30 may generate the payment authorization. The payment authorization may be encrypted. The payment authorization may be communicated through the first mobile device 10a and the short range communications 14 to the second mobile device 10b.

Figure 2A:
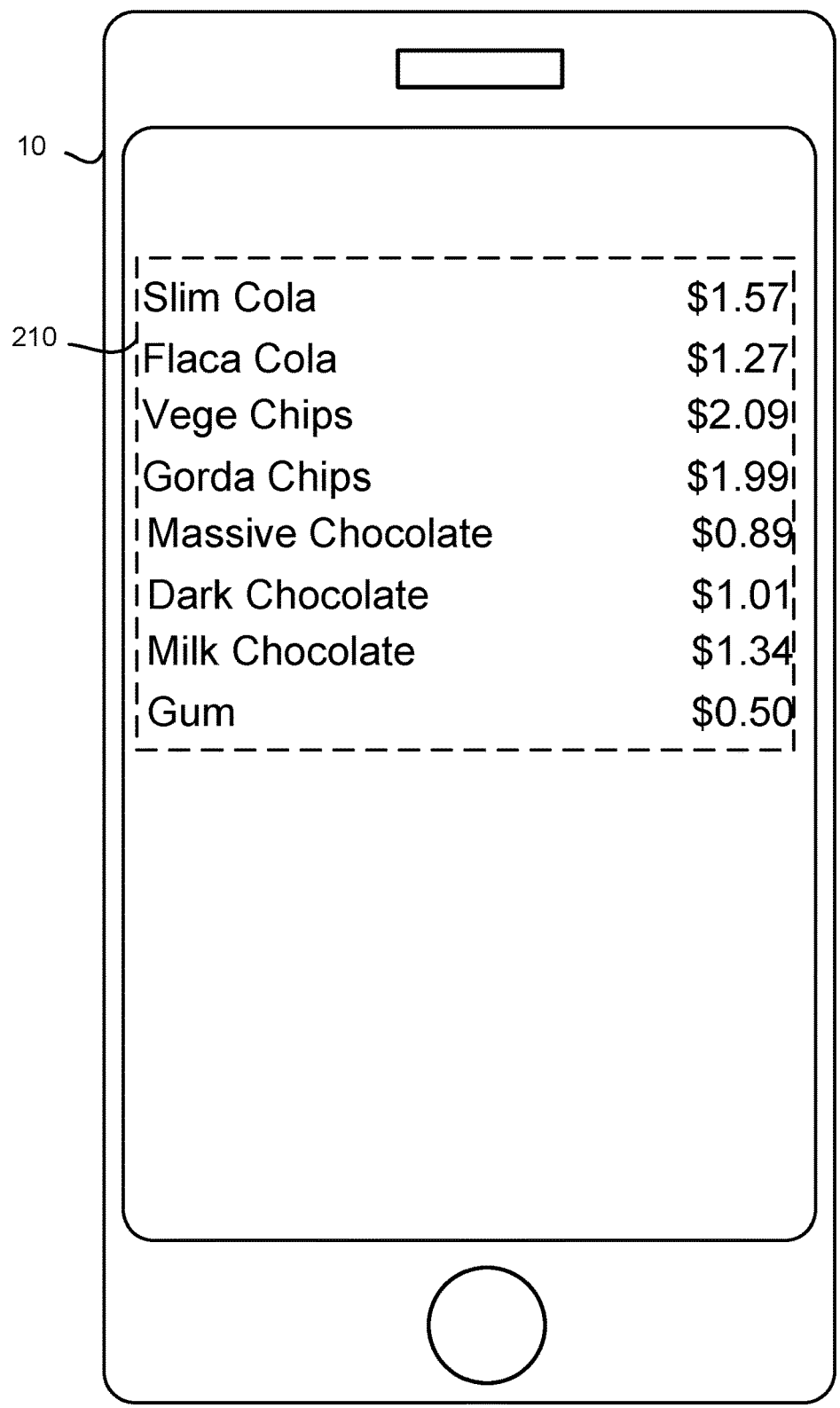
FIGS. 2A-D are drawings illustrating embodiments of purchase menus.

FIGS. 2A-D are drawings illustrating embodiments of purchase menus 210 displayed on mobile devices 10. As depicted in FIG. 2A, the purchase menu 210 may display a plurality of items 240. In addition, the purchase menu 210 may display a plurality of corresponding prices 250. The user may select an item 240 and the corresponding price 250. In one embodiment, the user may select a plurality of items 240 and prices 250. In a certain embodiment, the user may activate a select button 260 to initiate a transaction. The purchase menu 210 may also display purchase totals, contract terms, and the like.

Figure 2B:
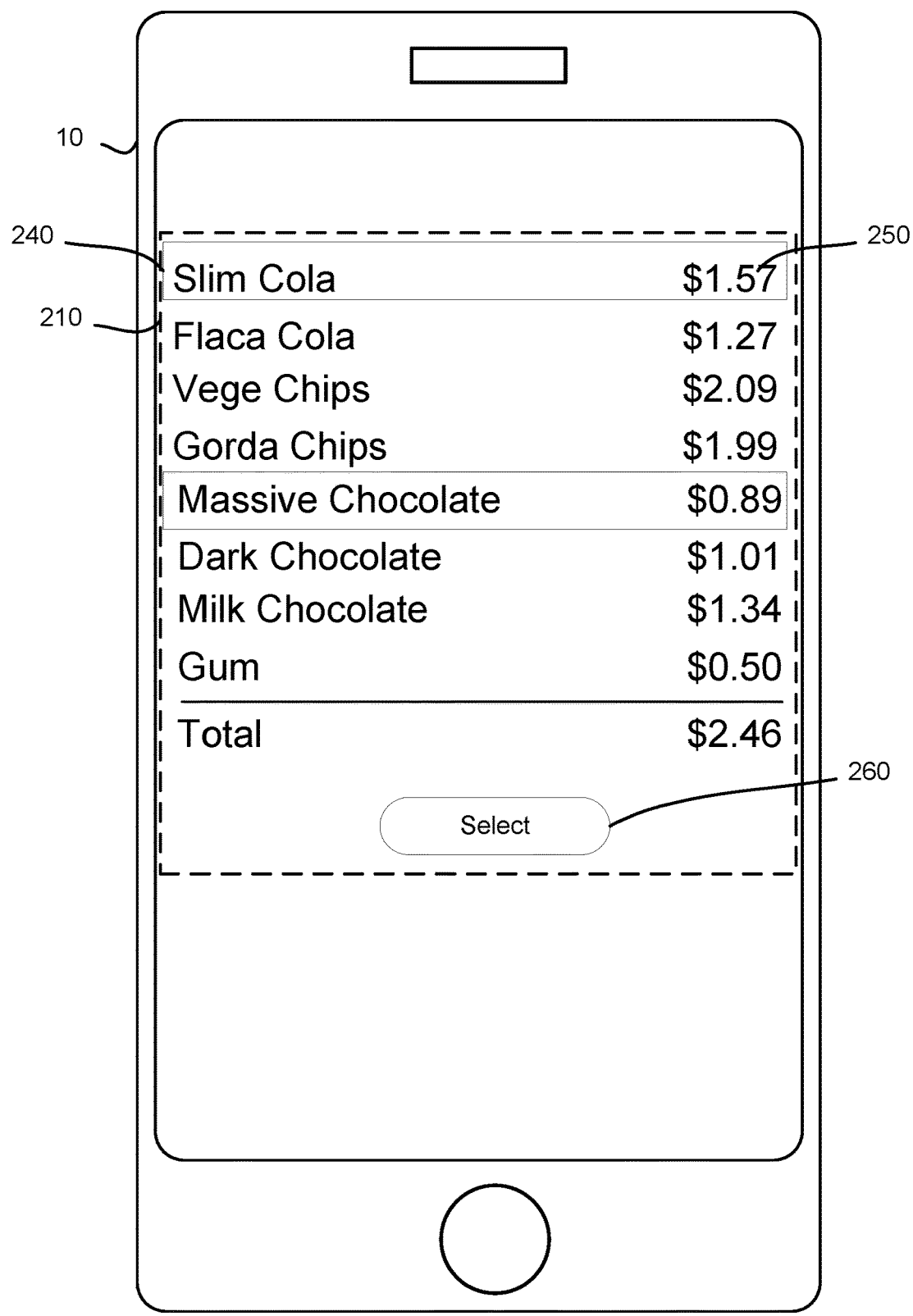
Figure 2C:
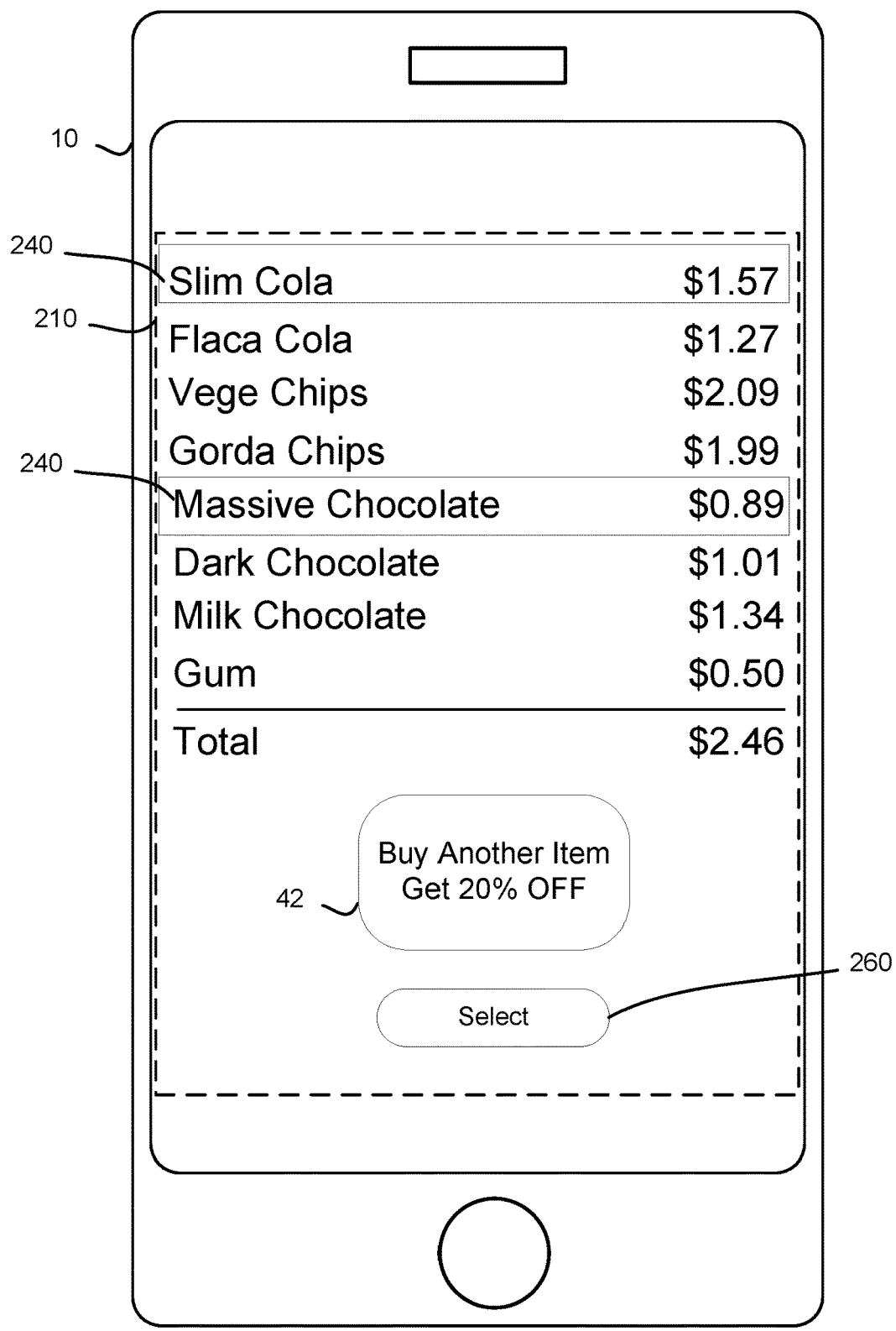

FIG. 2B depicts the purchase menu 210 with multiple items 240 selected and a total displayed. FIG. 2C depicts the purchase menu 210 with a special offer 42 displayed. The special offer 42 may be available to the user as part of the transaction. For example, the special offer 42 may encourage the user to purchase an additional item 240 and receive a discount. The special offer 42 may also invite the user to enter a discount code.

Figure 2D:
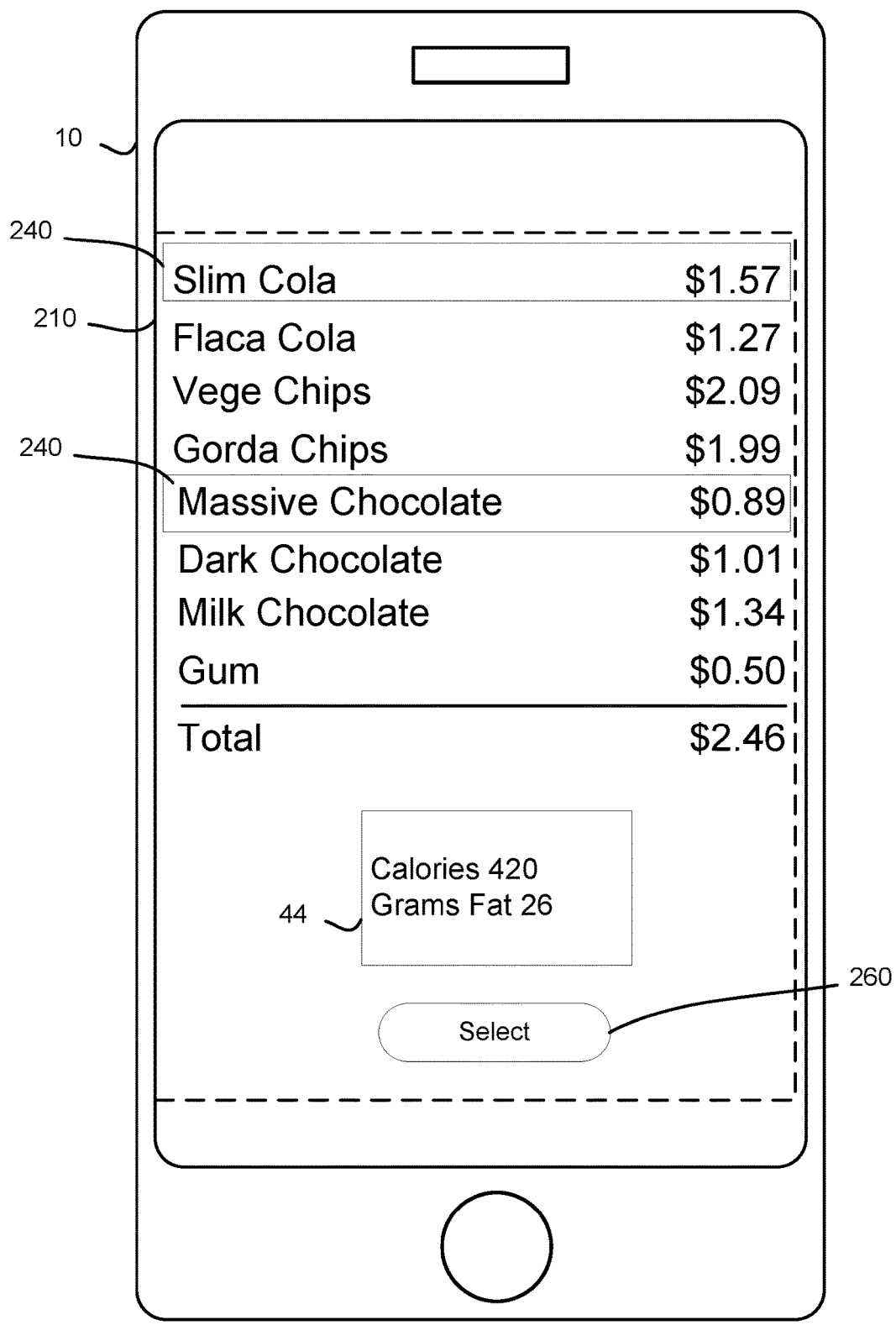

FIG. 2D depicts the purchase menu 210 with multiple items 240 selected. In addition, the purchase menu 210 displays nutritional information 44. For example, the nutritional information 44 may communicate calories, grams of fat, nutrients, and other nutritional data for the selected items 240.

Figure 3A:
FIGS. 3A-H are schematic block drawings illustrating embodiments of data stores.

FIGS. 3A-H are schematic block drawings illustrating embodiments of data stores. The data stores may be stored in a memory. In addition, the data stores may be communicated between devices. FIG. 3A depicts a point-of-sale code 205. The point-of-sale code 215 includes a merchant code 840 that identifies the merchant managing the point-of-sale device 20. In an alternative embodiment, the merchant code 840 may identify the account of an individual receiving a payment over a mobile device 10 such as was illustrated in FIG. 1D.

The address 845 may be the street address of the point-of-sale device 20. Alternatively, the address 845 may be a global coordinate, a local coordinate, and/or logical address. The unit code 850 may identify the point-of-sale device 20 to the merchant. The unit code 850 may identify a store, a vending machine, a kiosk, or the like. In one embodiment, the register code 855 identifies a register within a store as the point-of-sale device 20. In a certain embodiment, the timestamp 860 indicates when the point-of-sale code 205 is generated.

In one embodiment, the point-of-sale code 205 is encoded as a Quick Response (QR) code. The mobile device 10 may receive 505 the point-of-sale code by optically scanning the QR code on the point-of-sale device 20. For example, the point-of-sale device 20 may be a vending machine. A mobile telephone mobile device 10 may scan the QR code displayed by the vending machine.

In an alternate embodiment, the point-of-sale code 205 is encoded as a digital code transmitted wirelessly between the point-of-sale device 20 and the mobile device 10. For example, the point-of-sale code may be encoded as a NFC protocol code transmitted through the short range communications 14. Alternatively, the point-of-sale code 205 is transmitted using an infrared signal, an audio signal, a network communication, or the like.

Figure 3B:

FIG. 3B depicts one embodiment of the point-of-sale code 205 as communicated from the mobile device 10 to the clearing house 30. Upon receiving the point-of-sale code 205 from the point-of-sale device 20, the mobile device 10 may append an account alias 815 to the point-of-sale code 205. The account alias 815 may identify the mobile device 10 and/or the user of the mobile device 10 to the clearing house 30.

Figure 3C:

FIG. 3C illustrates one embodiment of the data store for the purchase menu 210. The purchase menu 210 may be communicated from the clearing house 30 to the mobile device 10. The purchase menu 210 may include the point-of-sale code 205, the items 240, the prices 250, the item descriptions 241, the special offer 42, the nutritional information 44, and the account alias 815. The item descriptions 241 may describe each of the items 240. The account alias 815 may identify the user account. In one embodiment, the account alias 815 identifies the user account without disclosing sensitive information. The account alias 815 may be encrypted as a one-time code associated with the point-of-sale code 205.

Figure 3D:

FIG. 3D illustrates one embodiment of the data store for an item selection 213. The selection includes the point-of-sale code 205, the selected items 240, the prices 250 for the selected items 240, the special offer 42 communicated to the purchase menu 210, the account alias 815, and a transaction identifier 890. The transaction identifier 890 may identify the transaction to the clearing house 30, the mobile device 10, and the point-of-sale device 20.

Figure 3E:

FIG. 3E depicts one embodiment of the data store for the payment authorization 215. The payment authorization 215 may include the point-of-sale code 205, the transaction identifier 890, a transaction amount 870, items 240 purchased, the prices 250 of the items purchased, and a timestamp 860. The transaction amount 870 may indicate a total amount payable to the point-of-sale device 20. In one embodiment, the payment authorization includes an item description, a customer name, a customer address, a customer phone number, a time stamp, and a special request.

Figure 3F:

FIG. 3F illustrates one embodiment of the data store for the user account 800. The user account 800 includes an account identifier 805, payment information 810, the account alias 815, and transaction records 830. The account identifier 805 may uniquely identify the account 800. The payment information 810 may be a bank account, credit card information, a credit balance, or other information for settling transactions. The transaction records 830 may record the details of each transaction using the account 800.

Figure 3G:

FIG. 3G depicts one embodiment of the data store for point-of-sale device locations 875. The point-of-sale device locations 875 include point-of-sale locations 295, purchase menus 210 for the point-of-sale devices 20 at the point-of-sale locations 295, and price comparisons 265 for the point-of-sale devices 20 at the point-of-sale locations 295. The point-of-sale device locations 875 may be communicated to the mobile device 10 in response to a request comprising location information for the mobile device 10.

Figure 3H:

FIG. 3H depicts the data store for an inventory 270. The inventory 270 may be stored at the clearing house 30. The inventory 270 includes one or more item inventories 275, an inventory report 276, and an inventory alert 277. The inventory report 276 and the inventory alert 277 may be generated from the inventories 275.

Figure 4:
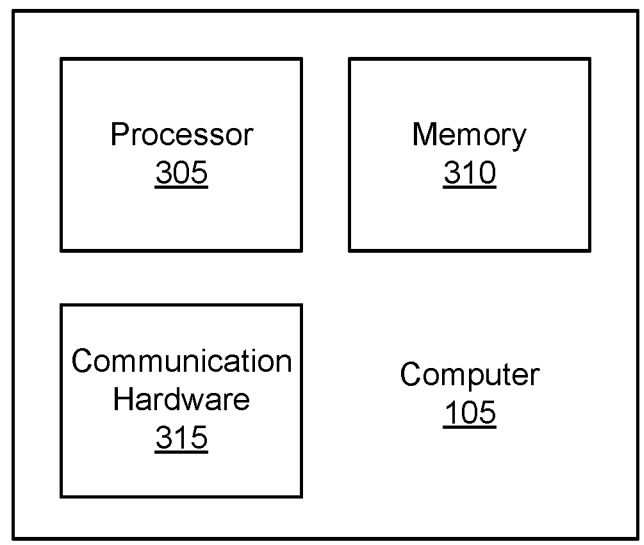
FIG. 4 is a schematic block diagram illustrating one embodiment of the computer.

FIG. 4 is a schematic block diagram illustrating one embodiment of a computer 105. An embodiment of the computer 105 may be included in the mobile device 10, the point-of-sale device 20, the clearing house 30, and the transmission device 40. The computer includes a processor 305, a memory 310, and a communication module 315. The memory 310 may store computer readable program code. The memory 310 may be a semiconductor memory, a hard disk drive, an optical storage device, a micromechanical storage device, or combinations thereof. The processor 305 may execute the computer readable program code. The communication module 315 may communicate with other devices.

Figure 5:
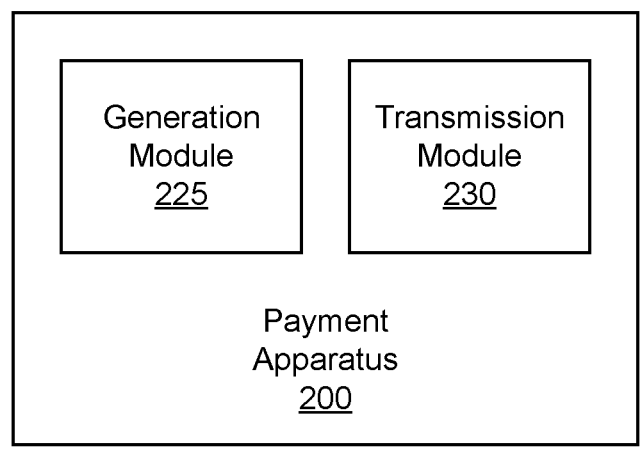
FIG. 5 is a schematic block diagram illustrating one embodiment of a payment apparatus.

FIG. 5 is a schematic block diagram illustrating one embodiment of a payment apparatus 200. The apparatus 200 includes a generation module 225 and a transmission module 230. The generation module 225 and the transmission module 230 may be embodied in computer readable program code stored in a computer readable storage medium such as the memory 310 and executed by the processor 305. The generation module 225 and the transmission module 230 may be embodied in the clearing house 30, the mobile device 10, the point-of-sale device 20 or combinations thereof.

The generation module 225 may generate the payment authorization 215. The transmission module 230 may communicate data between the mobile device 10, the point-of-sale device 20, and the clearing house 30. The transmission module 230 may also communicate data between the point-of-sale device 20, the transmission device 40, and the clearing house 30.

Figure 6A:
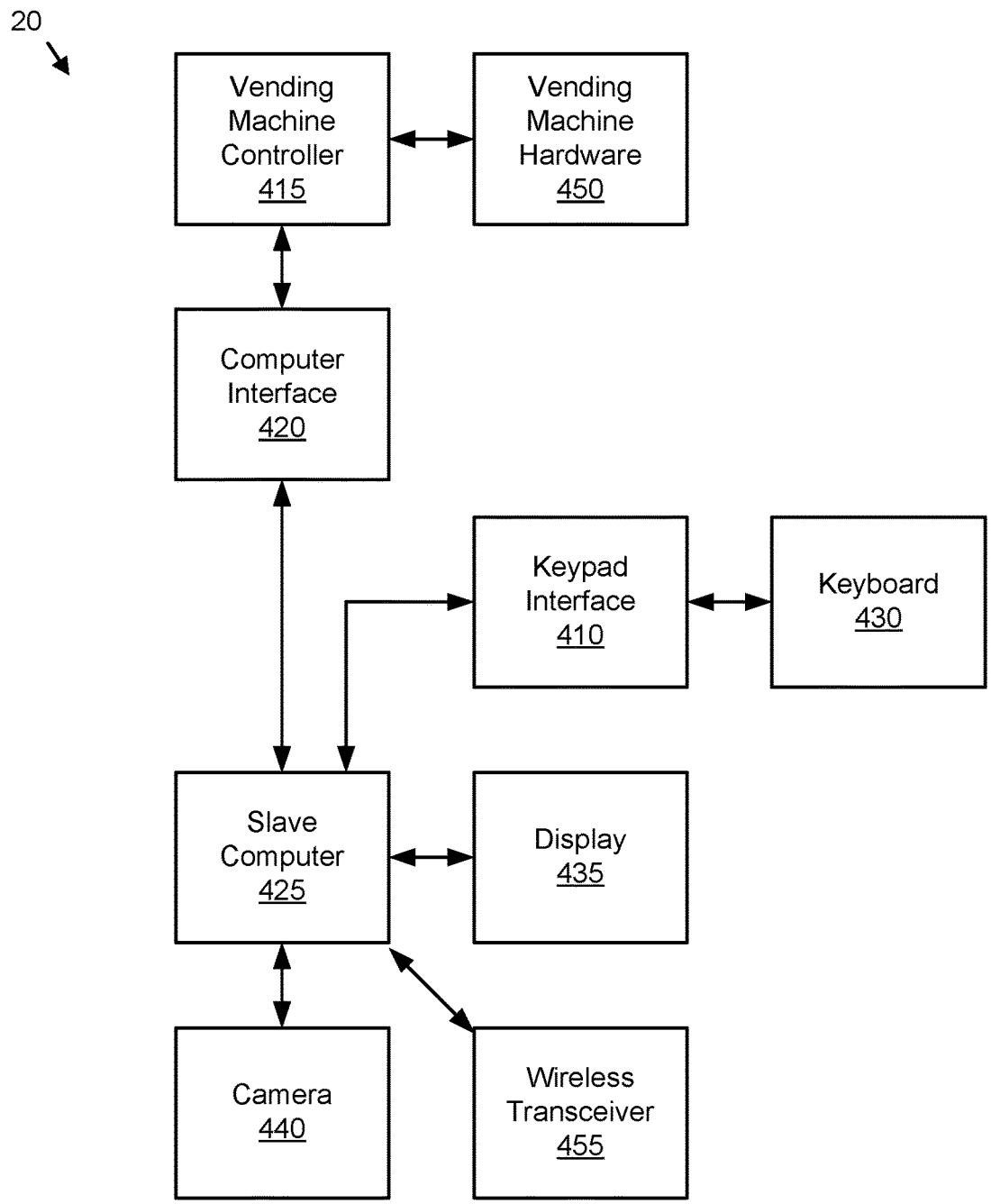
FIG. 6A is a schematic block diagram illustrating one embodiment of a point-of-sale device.

FIG. 6A is a schematic block diagram illustrating one embodiment of a point-of-sale device 20. In the depicted embodiment, the point-of-sale device 20 is embodied in a vending machine. The point-of-sale device 20 includes a vending machine controller 415, vending machine hardware 450, a computer interface 420, a keypad interface 410, keyboard 430, a slave computer 425, a display 435, and a camera 440. In one embodiment, the point-of-sale device 20 includes a wireless transceiver 455.

The vending machine hardware 450 may dispense items 240 as directed by the vending machine controller 415. The computer interface 420 may facilitate communications between the vending machine controller 415 and the slave computer 425. In one embodiment, the computer interface 420 is a PC2MDB manufactured by Upstate Networks Incorporated (Upstate Networks) of Utica, N.Y. The keyboard interface 410 may facilitate communications between the keyboard 430 disposed on the vending machine and the slave computer 425. In one embodiment, the keyboard interface 410 is a PC2ASD manufactured by Upstate Networks.

The slave computer 425 may be the computer 105. The slave computer 425 may communicate with the mobile device 10 through the display 435 and the camera 440. For example, the slave computer 425 may display the encoded point-of-sale code 205 on the display 435. The encoded point-of-sale code 205 may be encoded as a QR code. In addition, the slave computer 425 may receive the payment authorization 215 by capturing image of the encoded payment authorization 215 displayed on the mobile device 10 with the camera 440. The encoded payment authorization 215 may be encoded as a QR code. Alternatively, the slave computer 425 may communicate with the mobile device using the wireless transceiver 455. In one embodiment, the wireless transceiver 455 employees an NFC protocol.

The depicted point-of-sale device 20 has no hardware for communicating with the network 12, the clearing house 30, and/or the merchant that owns and/or manages the point-of-sale device 20. The point-of-sale device 20 may not communicate with the network 12, the clearing house 30, and/or the merchant that owns and/or manages the point-of-sale device 20. In one embodiment, the point-of-sale device 20 only communicates with the mobile device 10 through Quick Response codes and/or a Bluetooth connection. In addition, the point-of-sale device 10 may communicate with a transmission device 40 through the Bluetooth connection.

Figure 6B:
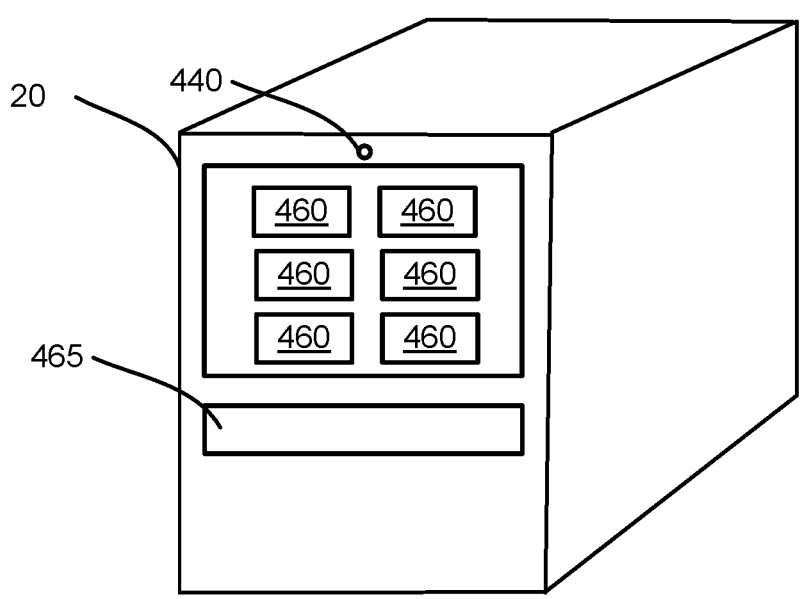
FIG. 6B is a drawing illustrating one embodiment of a point-of-sale device.

FIG. 6B is a drawing illustrating one embodiment of a point-of-sale device 20. In the depicted embodiment, the point-of-sale device 20 is a vending machine. The point-of-sale device 20 may enclose one or more products 460. The point-of-sale device 20 may further physically separate the products 460 from the mobile device 10 and/or a user. In one embodiment, in response to receiving a payment authorization 215, the point-of-sale device 20 may autonomous vend the product 460 from within the point-of-sale device 20 through a vending opening 465 to the user.

Figure 7:
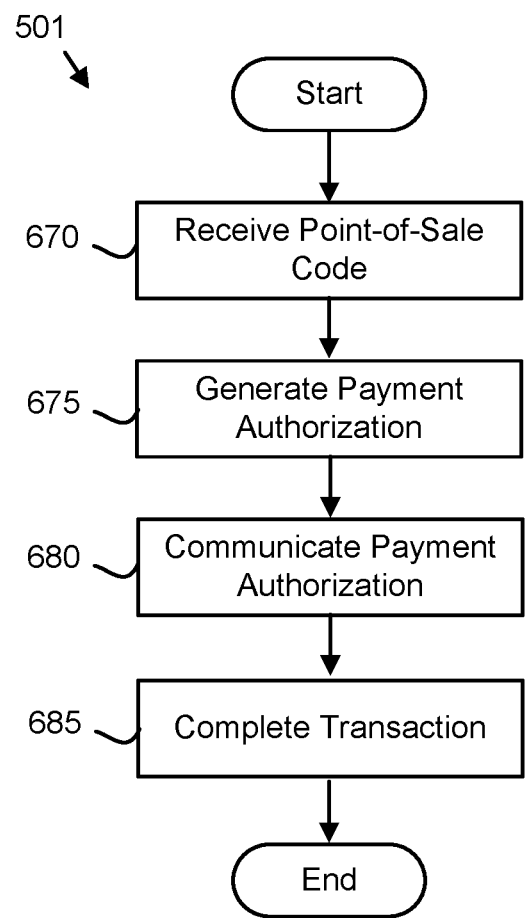
FIG. 7 is a schematic flow chart diagram illustrating one embodiment of a payment communication method.

FIG. 7 is a schematic flow chart diagram illustrating one embodiment of a payment communication method 501. The method 501 may perform the functions of the apparatus 200 and the system 100. In one embodiment, the method 501 is embodied in a computer readable storage medium such as the memory 310 storing computer readable program code. The computer readable program code may be executed by the processor 305 to perform the functions of the method 501.

The transmission module 230 may receive 670 an encoded point-of-sale code 205 from the point-of-sale device 20. The generation module 225 further generates 675 the payment authorization 215 in response to the point-of-sale code 205.

The transmission module 230 may further communicate 680 the payment authorization 215 through the mobile device 10 to the point-of-sale device 20. In one embodiment, the mobile device 10 does not communicate the payment authorization 215 to the point-of-sale device 20 until the mobile device 10 receives a user authorization.

In one embodiment, the point-of-sale device 20 parses the authorization code 890 from the payment authorization 215. The point-of-sale device 20 may validate the authorization code 890 with the authorization public key. In one embodiment, the authorization code 890 is validated if when decrypted with the authorization public key the authorization code 890 includes a known value.

In one embodiment, the point-of-sale device 20 completes 535 the transaction in response to receiving the payment authorization 215 and the method 501 ends. For example, the point-of-sale device 20 may vend a soft drink to the user. In one embodiment, if the point-of-sale device 20 is unable to complete transaction, the point-of-sale device 20 may store a refund memo that may be uploaded to the clearing house 30 through the transmission device 40.

The method 501 allows secure transactions with point-of-sale devices 20 that do not have network communications 24 with a network 12. In addition, the method 501 may be performed without using a credit card or bank network. Vital user information remains secure at the clearing house 30 and need not be transmitted.

Figure 8:
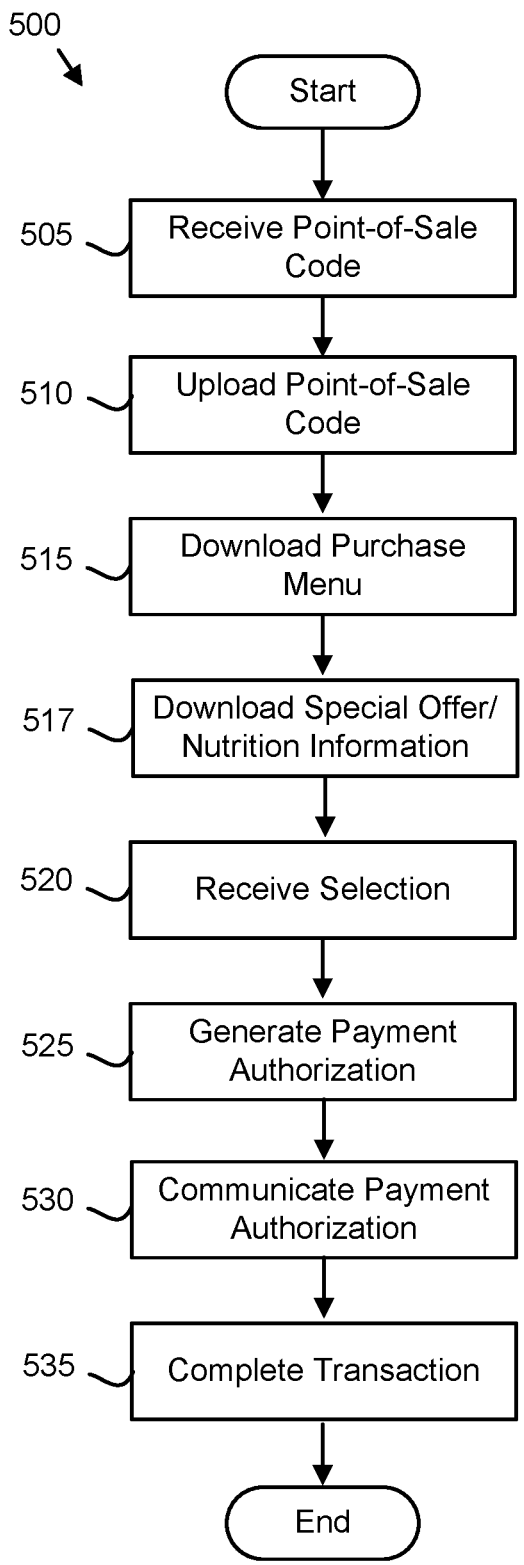
FIG. 8 is a schematic flow chart diagram illustrating one alternate embodiment of a payment communication method.

FIG. 8 is a schematic flow chart diagram illustrating one embodiment of a payment communication method 500. The method 500 may perform the functions of the apparatus 200 and the system 100. In one embodiment, the method 500 is embodied in a computer readable storage medium such as the memory 310 storing computer readable program code. The computer readable program code may be executed by the processor 305 to perform the functions.

The mobile device 10 may receive 505 an encoded point-of-sale code 205 from the point-of-sale device 20. The mobile device 10 may employ the short range communications 14 to communicate with the point-of-sale device 20. In one embodiment, the mobile device 10 scans a QR code on the display 435 of the point-of-sale device 20. Alternatively, the mobile device 10 may receive in NFC protocol transmission from the wireless transceiver 455.

The clearing house 30 may upload 510 the point-of-sale code 205 from the mobile device 10 over the network 12. In one embodiment, the clearing house 30 uses a portion of the point-of-sale code 205 as an index to retrieve a purchase menu 210 from a purchase menu database. In one embodiment, the merchant that owns the point-of-sale device 20 may communicate the purchase menu 210 along with the point-of-sale code 205 to the clearing house 30. Alternatively, the clearing house 30 may assign the point-of-sale code 205 to the merchant in response to receiving a purchase menu 210. The merchant may use a web interface to communicate the purchase menu 210 to the clearing house 30.

The purchase menu 210 may comprise an item entry comprising the price 250, the item 240, the item description 241, special offers 42, and nutritional information 44. In addition, the purchase menu 210 may include a shop keepers unit, and a minimum inventory quantity. The item 240 may be a good such as a soft drink. Alternatively, the item 240 may be a service such as a car wash. The price 250 may be the cost of the item 240.

The clearing house 30 may download 515 the purchase menu 210 to the mobile device 10 in response to the point-of-sale code 205. In addition, the clearing house 30 may download 517 the special offer 42 and nutrition information 44. The mobile device 10 may display the purchase menu 210 as shown in FIGS. 2A-D.

The clearing house 30 receives 520 the item selection 213 of the item 240 and the price 250 from the purchase menu 210. The user may select one or more items 240. In one embodiment, the user may activate a select button 260 to initiate a transaction. The mobile device 10 may communicate the item selection 213 with the selected item 240 and price 250 to the clearing house 30. The purchase menu 210 may also accept discount codes that may be appended to the special offer 42 and communicated with the item selection 213.

The clearing house 30 further generates 525 the payment authorization 215 in response to the item selection 213. The payment authorization 215 may comprise the point-of-sale code 205, an encrypted authorization code 890, and a transaction amount 870. In one embodiment, the authorization code 890 is a hash of an authorization private key stored by the clearing house 30. A corresponding authorization public key may be stored by the point-of-sale device 20. The authorization private key and the authorization public key may be a public/private key pair. Alternatively, encrypting the authorization code 890 may employ a private/private key pair. In one embodiment, the authorization code 890 employs a synchronous key pair. Alternatively, encrypting the authorization code 890 may employ an asynchronous key pair.

In one embodiment, the clearing house 30 transfers the transaction amount 870 for the items 240 from the fund source identified in the payment information 810 to the user account 800 associated with the mobile device 10 in response to generating the payment authorization 215. In one embodiment, the clearing house 30 debits a credit balance stored in the payment information 810. The transaction amount 870 may be held in escrow in the clearing house 30 in response to receiving a user authorization from the mobile device 10.

The clearing house 30 communicates 530 the payment authorization 215 through the mobile device 10 to the point-of-sale device 20. In one embodiment, the mobile device 10 does not communicate the payment authorization 215 to the point-of-sale device 20 until the mobile device 10 receives the user authorization. For example, the mobile device 10 may display a "make payment" button. The mobile device 10 may communicate the payment authorization 215 to the point-of-sale device 20 in response to the user selecting the "make payment" button.

The mobile device 10 may communicate 530 the payment authorization 215 through one a Quick Response code and a Bluetooth connection.

In one embodiment, the point-of-sale device 20 parses the authorization code from the payment authorization 215. The point-of-sale device 20 may validate the authorization code with the authorization public key. In one embodiment, the authorization code is validated if when decrypted with the authorization public key the authorization code includes a known value.

In one embodiment, the point-of-sale device 20 completes 535 the transaction in response to receiving a payment authorization 215 and the method 500 ends. The point-of-sale device 20 may complete 535 the transaction in response to the decrypted authorization code 890 comprising a known value. The point-of-sale device 20 may complete 535 the transaction for the transaction amount at the point-of-sale device 20 by vending the product 560 from within the point-of-sale device 20. In one embodiment, the point-of-sale device 20 stores the payment authorization 215. The point-of-sale device 20 may also communicate the payment authorization 215 to the clearing house 30. Alternatively, the point-of-sale device 20 only communicates the payment authorization 215 to a transmission device 40 over the Bluetooth connection. A service technician may use the transmission device 40 to retrieve the payment authorizations 215.

In one embodiment, the transmission device 40 receives the payment authorization 215 from the point-of-sale device 20. The transmission device 40 may communicate the payment authorization 215 to the clearing house 30 through the network 12. Alternatively, the point-of-sale device 20 may communicate the payment authorization 215 to the clearing house 30.

The clearing house 30 may transfer the transaction amount 870 from the account 800 to an account associated with the point-of-sale device 20 in response to matching the payment authorization 215 from a mobile device 10 with the payment authorization 215 from the point-of-sale device 20. The account associated with the point-of-sale device 20 may be a merchant account, a user account for a user of the second mobile device 10*b*, or the like. Alternatively, the clearing house 30 may transfer the transaction amount 870 from the account 800 to the account associated with the point-of-sale device 20 in response to matching the transaction code 890 of the payment authorization 215 with the transaction code 890 received from the point-of-sale device 20.

Figure 9:
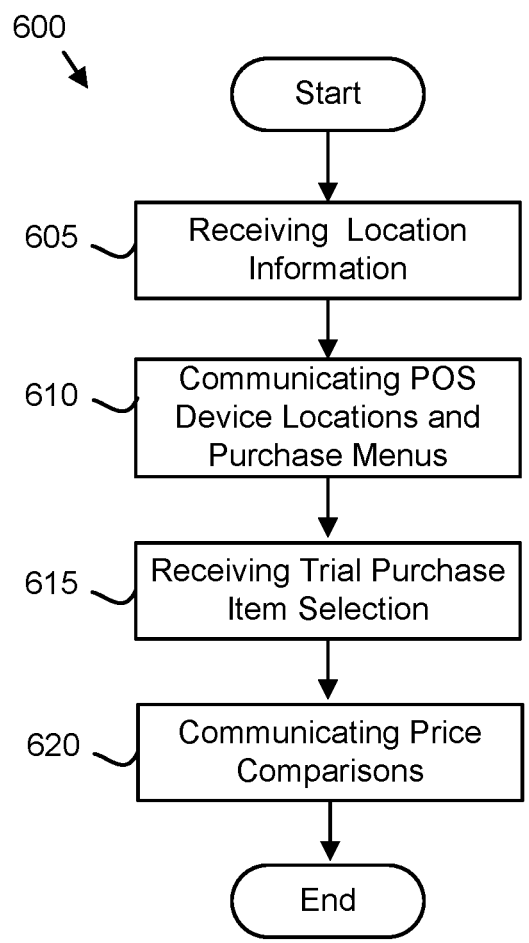
FIG. 9 is a schematic flow chart diagram illustrating one embodiment of a point-of-sale device location method.

FIG. 9 is a schematic flow chart diagram illustrating one embodiment of a point-of-sale device location method 600. The method 600 may perform the functions of the apparatus 200 and the system 100. In one embodiment, the method 600 is embodied in a computer readable storage medium such as the memory 310 storing computer readable program code. The computer readable program code may be executed by the processor 305 to perform the functions of the method 600.

The method 600 starts, and in one embodiment the clearing house 30 receives 605 a location request comprising location information for the mobile device 10. The location information may be a global coordinate, an address, or combinations thereof.

The clearing house 30 may communicate 610 point-of-sale device locations 295 near the location information to the mobile device 10. In one embodiment, the point-of-sale device locations 295 are within a specified distance of the location information. The specified distance may be between 100 and 10,000 meters. In addition, the clearing house 30 may communicate 610 purchase menus 210 for the point-of-sale device locations 295 near the location information to the mobile device 10.

The clearing house 30 may further receive 615 a trial item selection 213 from the mobile device 10. The trial item selection 213 may be encoded to indicate that the mobile device 10 is not purchasing the items 240 of the trial item selection 213. In one embodiment, the clearing house 30 communicates 620 price comparisons 265 to the mobile device 10 in response to the trial item selection 213 and the method 600 ends. Alternatively, the clearing house 30 may communicate 620 the price comparisons 265 while communicating 610 the point-of-sale device locations 295 and the purchase menus 210. A user my employ the point-of-sale device locations 295 and the price comparisons 265 to select a point-of-sale device 20.

Figure 10:
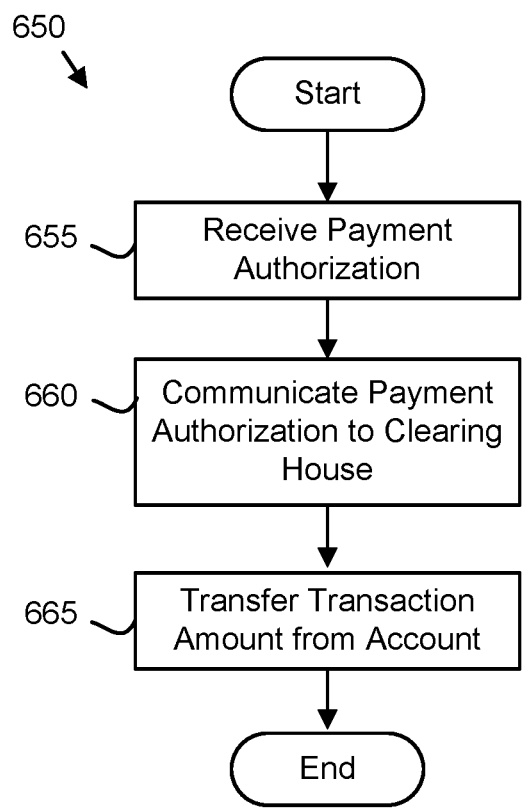
FIG. 10 is a schematic flow chart diagram illustrating one embodiment of a payment transfer method.

FIG. 10 is a schematic flow chart diagram illustrating one embodiment of a payment transfer method 660. The method 650 may perform the functions of the apparatus 200 and the system 100. In one embodiment, the method 650 is embodied in a computer readable storage medium, such as the memory 310, storing computer readable program code. The computer readable program code may be executed by the processor 305 to perform the functions of the method 650.

The method 650 starts, and in one embodiment the point-of-sale device 20 receives 655 the payment authorization 215 from the mobile device 10. The payment authorization 215 may be received over the short range communications 14. The point-of-sale device 20 may communicate 660 the payment authorization 215 to the clearing house 30. The clearing house 30 may match the payment authorization 215 received from the point-of-sale device 20 to the payment authorization 215 sent to the mobile device 10. If the payment authorizations 215 match, the clearing house 30 may transfer 665 the transaction amount 870 from the account 800 of the mobile device 10 to an account for the point-of-sale device 20 and the method 650 ends.

Figure 11:
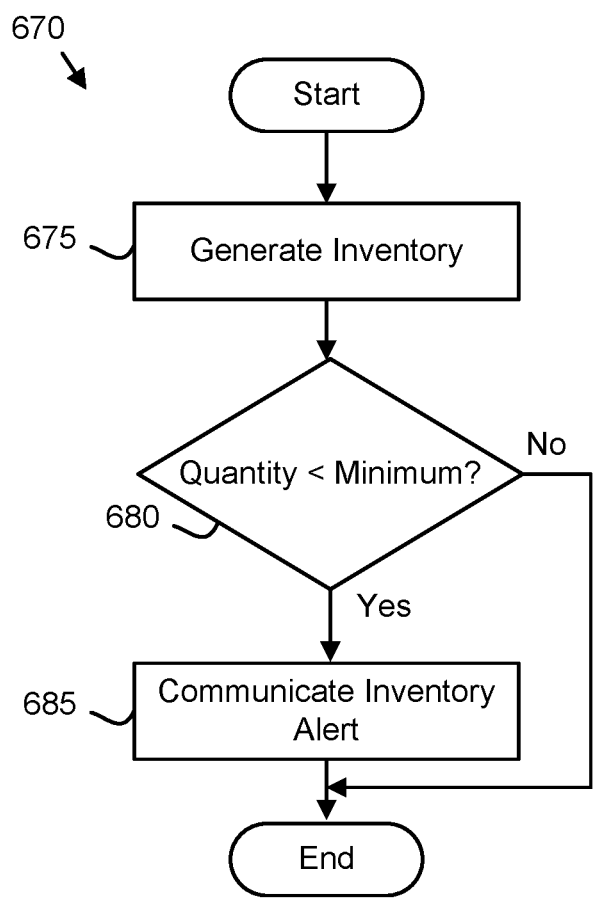
FIG. 11 is a schematic flow chart diagram illustrating one embodiment of an inventory method.

FIG. 11 is a schematic flow chart diagram illustrating one embodiment of an inventory method 670. The method 670 may perform the functions of the apparatus 200 and the system 100. In one embodiment, the method 670 is embodied in a computer readable storage medium such as the memory 310 storing computer readable program code. The computer readable program code may be executed by the processor 305 to perform the functions of the method 670.

The method 670 starts, and in one embodiment, the clearing house 30 generates 675 an inventory 270 for the point-of-sale device 20. In one embodiment, the clearing house 30 generates 675 the inventory 270 by subtracting items 240 that have been sold from the item inventory 275. In one embodiment, the clearing house 30 also generates 675 an inventory report 276.

The clearing house 30 may determine 680 if the quantity of the item 240 specified by the inventory 270 is less than minimum inventory quantity. If the quantity of the item 240 is less than the minimum inventory quantity, the clearing house 30 may further generate 685 an inventory alert 277 and the method 670 ends. The inventory alert 277 may be communicated to the merchant on in the point-of-sale device 20, a service organization, and/or the point-of-sale device 20. The inventory alert 277 may include the inventory 270 and the minimum inventory quantity. If the quantity of the item 240 is not less than the minimum inventory quantity, the method 670 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating payments comprising:
   reading, by use of processor, a point-of-sale code from a vending machine with a mobile device, wherein the point-of-sale code is encoded in one of a first Quick Response code and a Bluetooth connection, the vending machine is not in communication with a clearing house and a merchant, the vending machine is only in communication with the mobile device through one of Quick Response codes and the Bluetooth connection, the vending machine encloses and physically separates a product from the mobile device, and the vending machine autonomously vends the product;
   uploading the point-of-sale code from the mobile device to the clearing house embodied in one or more servers;
   downloading a purchase menu from the clearing house to the mobile device in response to the point-of-sale code;
   receiving an item selection from the purchase menu on the mobile device;
   generating a payment authorization in response to the point-of-sale code at the clearing house, the payment authorization comprising the point-of-sale code, an encrypted authorization code, and a transaction amount;
   communicating the payment authorization through the mobile device to the vending machine through one of a second Quick Response code and the Bluetooth connection; and
   in response to receiving the payment authorization and in response to the decrypted authorization code comprising a known value, completing a transaction for the transaction amount at the vending machine by vending the product from within the vending machine.

2. The method of claim 1, wherein the item selection comprises one or more items, each item having a price, the payment authorization comprises an item description, a customer name, a customer address, a customer phone number, a time stamp, and a special request, and the method further comprising downloading a special offer and downloading nutritional information with the purchase menu.

3. The method of claim 1, wherein the encrypted authorization code is created as a hash function of an authorization private key and validated with an authorization public key stored by the vending machine.

4. The method of claim 1, wherein the point-of-sale code and the payment authorization are encoded using one of the first and second Quick Response code, the Bluetooth connection, and a near field communication protocol.

5. The method of claim 1, the method further comprising:
   receiving a location request comprising location information;
   communicating vending machine locations near the location information;
   receiving a trial item selection; and
   communicating price comparisons.

6. The method of claim 1, the method further comprising:
   receiving the payment authorization from the vending machine at a transmission device in communication with a network;
   communicating the payment authorization from the transmission device to the clearinghouse; and
   transferring the transaction amount from a user account associated with the mobile device to an account associated with the vending machine in response matching the payment authorization from the mobile device with the payment authorization from the vending machine.

7. The method of claim 1, wherein the transaction amount is held in escrow at the clearing house in response to communicating the payment authorization.

8. The method of claim 1, wherein the payment authorization is communicated from the mobile device to the vending machine in response to a user authorization.

9. The method of claim 1, wherein the vending machine is selected from the group consisting of a food vendor kiosk, a transit kiosk, a service kiosk, a parking kiosk, a ticket kiosk, a fuel kiosk, and a rental kiosk.

10. The method of claim 1, wherein the vending machine is a peer second mobile device.

11. The method of claim 1, wherein the mobile device is selected from the group consisting of a mobile telephone, a tablet computer, a wearable computer, and a payment fob.

12. The method of claim 1, wherein the point-of-sale code comprises a merchant code, an address, and a unit code.

13. The method of claim 1, wherein the purchase menu comprises an item entry comprising the price, the item, and an item description.

14. The method of claim 1, further comprising generating an inventory of an item in the vending machine.

15. The method of claim 1, further comprising communicating an inventory alert in response to the inventory of the item being less than a minimum inventory quantity.

16. A program product comprising a computer readable storage medium storing computer readable code executable by a processor to perform:
   reading a point-of-sale code from a vending machine with a mobile device, wherein the point-of-sale code is encoded in one of a first Quick Response code and a Bluetooth connection, the vending machine is not in communication with a clearing house and a merchant, the vending machine is only in communication with the mobile device through one of Quick Response codes and the Bluetooth connection, the vending machine encloses and physically separates a product from the mobile device, and the vending machine autonomously vends the product;
   uploading the point-of-sale code from the mobile device to the clearing house embodied in one or more servers;
   downloading a purchase menu from the clearing house to the mobile device in response to the point-of-sale code;
   receiving an item selection from the purchase menu on the mobile device;
   generating a payment authorization in response to the point-of-sale code at the clearing house, the payment authorization comprising the point-of-sale code, an encrypted authorization code, and a transaction amount;
   communicating the payment authorization through the mobile device to the vending machine through one of a second Quick Response code and the Bluetooth connection; and in response to receiving the payment authorization and in response to the decrypted authorization code comprising a known value, completing a transaction for the transaction amount at the vending machine by vending the product from within the vending machine.

17. The program product of claim 16, the processor further performing:
   receiving the payment authorization from the vending machine at a transmission device in communication with a network;
   communicating the payment authorization from the transmission device to the clearinghouse; and
   transferring the transaction amount from a user account associated with the mobile device to an account associated with the vending machine in response matching the payment authorization from the mobile device with the payment authorization from the vending machine.

18. The program product of claim 17, wherein the transaction amount is held in escrow at the clearing house in response to communicating the payment authorization.

19. An apparatus comprising:
   a processor;
   a memory storing code executable by the processor to perform:
   reading a point-of-sale code from a vending machine with a mobile device, wherein the point-of-sale code is encoded in one of a first Quick Response code and a Bluetooth connection, the vending machine is not in communication with a clearing house and a merchant, the vending machine is only in communication with the mobile device through one of Quick Response codes and the Bluetooth connection, the vending machine encloses and physically separates a product from the mobile device, and the vending machine autonomously vends the product;
   uploading the point-of-sale code from the mobile device to the clearing house embodied in one or more servers;
   downloading a purchase menu from the clearing house to the mobile device in response to the point-of-sale code;
   receiving an item selection from the purchase menu on the mobile device;
   generating a payment authorization in response to the point-of-sale code at the clearing house, the payment authorization comprising the point-of-sale code, an encrypted authorization code, and a transaction amount;
   communicating the payment authorization through the mobile device to the vending machine through one of a second Quick Response code and the Bluetooth connection; and
   in response to receiving the payment authorization and in response to the decrypted authorization code comprising a known value, completing a transaction for the transaction amount at the vending machine by vending the product from within the vending machine.

20. The apparatus of claim 19, the processor further performing:
   receiving the payment authorization from the vending machine at a transmission device in communication with a network;
   communicating the payment authorization from the transmission device to the clearinghouse; and
   transferring the transaction amount from a user account associated with the mobile device to an account associated with the vending machine in response matching the payment authorization from the mobile device with the payment authorization from the vending machine.

* * * * *